United States Patent
Jansson et al.

(10) Patent No.: US 7,983,240 B2
(45) Date of Patent: Jul. 19, 2011

(54) SYSTEM AND METHOD FOR COMMUNICATION SESSION CORRELATION

(75) Inventors: Michael Jansson, Stockholm (SE);
Ioannis Fikouras, Alsdorf (DE);
Salvatore Loreto, Helsinki (FI); Elena Fersman, Uppsala (SE); Roman Levenshteyn, Aachen (DE); Gonzalo Camarillo, Helsinki (FI); Göran Anders Petter Eriksson, Norrtälje (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 399 days.

(21) Appl. No.: 11/549,746

(22) Filed: Oct. 16, 2006

(65) Prior Publication Data

US 2008/0089344 A1    Apr. 17, 2008

(51) Int. Cl.
    *H04L 12/28* (2006.01)
(52) U.S. Cl. ........................... 370/351; 455/518
(58) Field of Classification Search .................. 370/351;
    379/88.16, 220.01; 455/518, 412.1
    See application file for complete search history.

(56) References Cited

U.S. PATENT DOCUMENTS

| | | | |
|---|---|---|---|
| 2004/0073658 A1* | 4/2004 | Oran et al. | 709/224 |
| 2005/0058125 A1* | 3/2005 | Mutikainen et al. | 370/354 |
| 2006/0046757 A1* | 3/2006 | Hoover et al. | 455/518 |
| 2006/0093101 A1* | 5/2006 | Patel et al. | 379/88.16 |
| 2006/0212511 A1* | 9/2006 | Garcia-Martin | 709/203 |
| 2006/0294245 A1* | 12/2006 | Raguparan et al. | 709/227 |
| 2007/0064672 A1* | 3/2007 | Raghav et al. | 370/351 |

OTHER PUBLICATIONS

S. Loreto, et al., "The Session Initiation Protocol (SIP) Dialog Correlation," Sipping Working Group, Internet Draft, Ericsson, Jun. 25, 2006.
E. Henrikson, "Private SIP Extension for Original Dialog Identifier," Internet Draft, Lucent Technologies, May 2002.

* cited by examiner

*Primary Examiner* — Dang T Ton
*Assistant Examiner* — Wei Zhao

(57) ABSTRACT

A system and method for correlating communication sessions. A globally unique correlation identifier is created and exchanged between the parties during SIP session setup to allow for association and correlation of additional SIP sessions. The correlation information may then be used by network and session entities to perform different services.

17 Claims, 7 Drawing Sheets

SYSTEM AND METHOD FOR COMMUNICATION SESSION CORRELATION

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates generally to communication systems. More particularly, and not by way of limitation, the invention is directed to a system and method for correlating different communication sessions.

Correlation is a mathematical term for a statistical measurement on the degree of dependency of two variables. In mathematics, a correlation coefficient is used to indicate the strength and direction of a linear relationship between two random variables. In communication systems, it is desirable to know whether two or more sessions used to set up media streams are correlated in some sense (for example, in the sense that they are used in the same context). Such sessions may be set up and operated under the Session Initiation Protocol (SIP) or other suitable communication protocol. On the terminal side, such a correlation could mean, for example, displaying text from a chat session and video from another session in the same terminal window. On the network side, it could mean, for example, applying some special charging scheme to a multi-service session comprised of two or more individual sessions.

In order to provide these and similar services, it must be determined and communicated how sessions relate to each other. However, there is no inherent mechanism in today's networks that provides the capability to indicate correlation between SIP sessions. Rather, higher level applications utilizing multiple SIP sessions must correlate the sessions at the application level using information available to each particular application. Due to the lack of inherent correlation mechanisms, however, the application level correlations may lead to false correlation assumptions.

What is needed in the art is a system and method for correlating different communication sessions which overcomes the shortcomings of the prior art. The present invention provides such a system and method.

BRIEF SUMMARY OF THE INVENTION

The present invention provides a system and method for correlating communication sessions. The invention creates and exchanges between the parties, a globally unique correlation identifier during SIP session setup to allow for association and correlation of SIP sessions. The correlation information may then be used by network and session entities to perform different services.

Thus, in one aspect, the present invention is directed to a method of correlating different communication sessions. The method includes creating a globally unique correlation identifier during establishment of a first communication session between a first entity and a second entity; storing the correlation identifier by the first and second entities; and utilizing the correlation identifier to correlate with the first session, a subsequent session established between the first and second entities.

In another aspect, the present invention is directed to a system for correlating different communication sessions. The system includes means for creating a globally unique correlation identifier during establishment of a first communication session between a first entity and a second entity; means for storing the correlation identifier by the first and second entities; and means for utilizing the correlation identifier to correlate with the first session, a subsequent session established between the first and second entities.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

Figure 1:
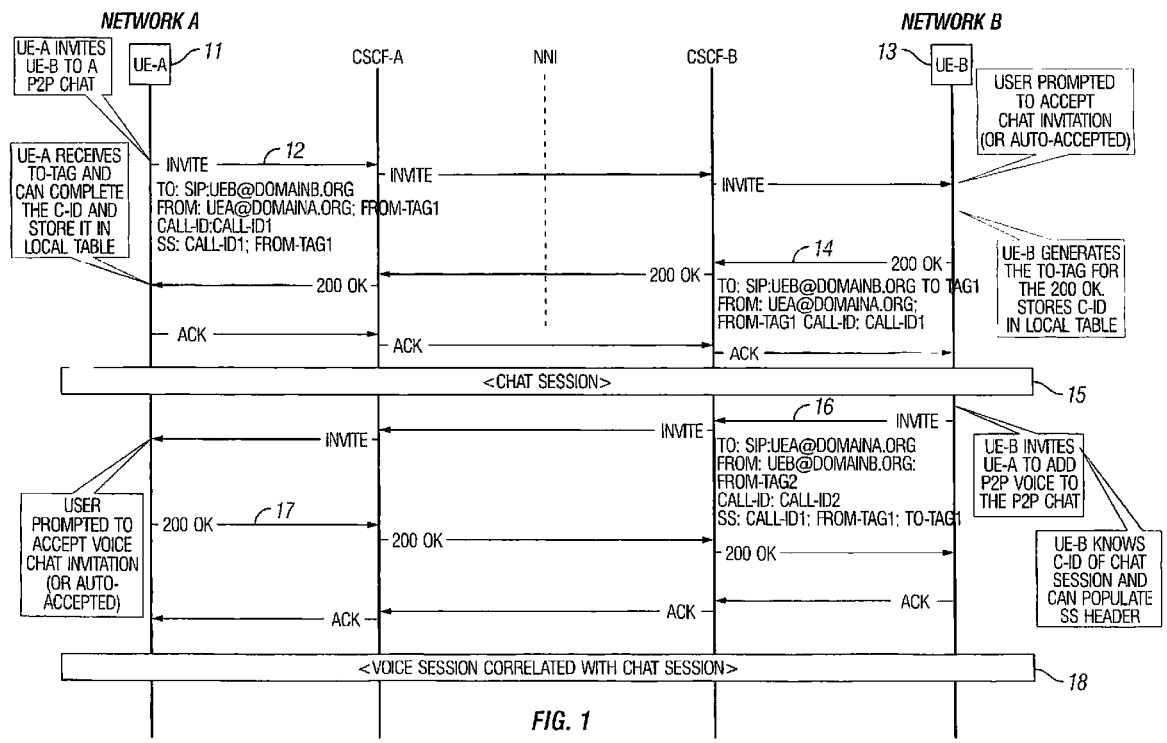
FIG. 1 is a signaling diagram illustrating the flow of messages between various network entities when establishing a SIP session utilizing a Same-Session (SS) header in accordance with the teachings of the present invention.

The present invention provides a system and method for correlating communication sessions. The invention creates and exchanges between the parties, a globally unique correlation identifier during SIP session setup to allow for association and correlation of SIP sessions. The correlation information may then be used by network and session entities to perform different services. It should be noted that sessions may be conducted between fixed terminals, mobile terminals, user agents, network nodes, and the like. The term "entities" is used herein to encompass all terminals, agents, nodes, and the like that may be parties to sessions. This invention is also described in S. Loreto et al., "The Session Initiation Protocol (SIP) Dialog Correlation", IETF SIPPING Working Group Internet Draft, Jun. 25, 2006, which is incorporated by reference herein in its entirety. This draft is available online at http://tools.ietf.org/wg/sipping/draft-loreto-sipping-dialog-correlation-01.txt.

In an exemplary embodiment, the present invention communicates a correlation identifier (ID) in a new header with the label "Same-Session" added to the SIP INVITE and REFER messages. In one embodiment, the correlation ID may be communicated between two user agents (UAs) in a simple point-to-point (P2P) scenario in which both UAs have all the information required to uniquely identify the dialog (Call-ID, From-Tag, and To-Tag) with one correlation ID. In other embodiments addressing the use of intermediaries (for example a business-to-business (B2B) UA, group communications, and use of multiple correlation IDs, the correlation ID may be sent to multiple entities.

In the preferred embodiment, the invention creates and exchanges a globally unique correlation ID during IP Multimedia Subsystem (IMS) session establishment. The exchange of the globally unique correlation ID provides the ability to associate and correlate independent IMS sessions (for example, SIP sessions). The correlation IDs may be transported in a SIP header field.

The preferred embodiment for the correlation ID is a value comprising a number of attributes derived from the SIP session. In the P2P case, the correlation ID preferably includes three parameters: Call-ID, To-Tag, and From-Tag. Although the Call-ID and From-Tag make the correlation ID globally unique on their own, the To-Tag is needed to address the scenario of forking proxies in the path of signaling. Thus, the P2P correlation ID may take the form:
 Same-Session: Call-Id;From-Tag;To-Tag
 For example, the P2P correlation ID may appear as:
 Same-Session: 3s09cs03;ty20s;d92119.

In the P2P case, the Call-ID and From-Tag are derived from the INVITE request, and the To-Tag is derived from the 200 OK response to the request. For example in a session setup request, the Call-ID, From-Tag, and To-Tag may appear as:
 INVITE sip:alice.doe@home1.net SIP/2.0
 From: <sip:elisa.coya@example.net>;tag=ty20s
 To: <sip:alice.doe@home1.net>
 Call-ID: 3s09cs03
 The response message may include the following fields:
 SIP/2.0 200 OK
 From: <sip:elisa.coya@example.net>;tag=ty20s
 To: <sip:alice.doe@home1.net>;tag=d92119
 Call-ID: 3s09cs03

In the case of an intermediary (e.g., a B2B UA) inside the signaling path between the two UAs, additional logic is required, both in the UAs and in the B2B UA. This enables the exchange of the aforementioned information between the two independent sessions established by the intermediary with two communication partners.

In the intermediary case, the Call-ID is different on the receiving and transmitting sides of the intermediary. For example, the two Call-IDs may take the form:
 Same-Session: Focal Point URI
 Same-Session: conf123@factory.domainA.org In the group communication cases, the correlation ID may include a single focal point URI, which is inherently unique and is assigned by the conference factory during conference creation. The focal point URI is used to create the correlation ID. The correlation ID is unique because the conference factory assigns unique URIs to each new conference instance. The focal point URI is communicated to the creator of the conference during the conference creation process (in the contact header of the 200 OK).

In a dial-in conference scenario, a REFER request is then submitted from the creator of the conference to the other participant(s). The Same-Session header in the REFER request contains the focal point URI as the correlation ID as described above. In this case, the correlation ID value is inserted in the Refer-to header.

If the invitation is accepted, the receiver of the REFER request then issues an INVITE request to the focal point containing the same correlation ID in the Same-Session header.

In a dial-out scenario the procedure is the same with the exception that the REFER request is sent to the focal point responsible for issuing the INVITE request(s).

For example, a conference creation request sent to a conference factory may take the form:
 INVITE sip:conf_fact@domainA.org SIP/2.0
 From: <sip:ueA@domainA.org>;tag=ty20s
 To: <sip:conf_fact@domainA.org>
 A response to the conference creation request containing a focal point URI may take the form:
 SIP/2.0 200 OK
 From: <sip:ueA@domainA.org>;tag=ty20s
 To: <sip:conf_fact@domainA.org>;tag=d92119
 Contact:<sip: conf123@factory.domainA.org>
 A REFER message containing the correlation ID (focal point URI) may then take the form:
 REFER sip:b@domainB.org SIP/2.0
 From: <sip:a@domainA.org>;tag=193402342
 To: <sip:b@domainB.org>
 Contact: <sip:a@domainA.org>
 Refer-To: conf456@factory.domainA.org?Same-Session=conf123@factory.domainA.org; text
 Same-Session: conf123@factory.domainA.org The present invention includes a method of correlating independent IMS sessions in independent correlation groups. During the establishment of a new session, a new correlation ID is created and used. If the new session should be correlated with an existing session, the correlation ID of the existing session is used. All sessions using the same correlation ID are considered to be correlated.

FIG. 1 is a signaling diagram illustrating the flow of messages between various network entities when establishing a SIP session utilizing a Same-Session (SS) header in accordance with the present invention. During the establishment of the first, new, session (not to be correlated with an existing session), UE-A 11 populates the Same-Session header of the INVITE message 12 with two out of three of the correlation ID parameters (i.e., the Call-ID and the From-Tag). The third parameter (i.e., the To-Tag) is created by UE-B 13 and is included in the 200 OK response message 14. Once the establishment procedure is complete, both parties may store the correlation ID in a local correlation table or other mapping construct (e.g., table, hash, and the like) and may use the correlation ID when establishing future sessions. The session, in this example a chat session 15, is then established.

An exemplary mapping table is shown in Table 1 below. The mapping table is used to associate correlation IDs with session IDs. Additional entries such as the media type may be included, but are not required for mapping purposes.

TABLE 1

| Correlation ID | Dialogue ID | |
| --- | --- | --- |
| Call-ID1, From-Tag1, To-Tag1 | Call-ID1, From-Tag1, To-Tag1 | Chat session |
| Call-ID1, From-Tag1, To-Tag1 | Call-ID2, From-Tag2, To-tag2 | VoIP session |

Still referring to FIG. 1, at some later point in time, UE-B 13 adds a VoIP component to the ongoing chat by establishing a new SIP session. In order to correlate the new session to the existing one, UE-B uses the dialogue ID (i.e., session identifier) of the ongoing chat session as a key to perform a search in the correlation table and fetch the correlation ID for use in the correlation procedure. UE-B places the correlation ID in a Same-Session header of the INVITE message 16 and sends it to UE-A 11.

Upon receiving the INVITE message 16 with the Same-Session header containing a complete correlation ID (i.e., with all three parameters), UE-A 11 interprets this as a session that should be correlated with an existing session. UE-A then accesses its correlation table to find a match for the correlation ID received. If a match is found, it means that UE-A is already part of an ongoing session to which the correlation ID points. The new, now correlated session, is inserted as a new entry in the table. If a match is not found, UE-A may add the correlation ID to the table, thereby acknowledging the correlation to an existing session in which it (UE-A) is not involved. UE-A accepts in a 200 OK message 17, and the P2P voice session is established and correlated with the P2P chat session at step 18. Alternatively, UE-A may reject the request.

Figure 2:
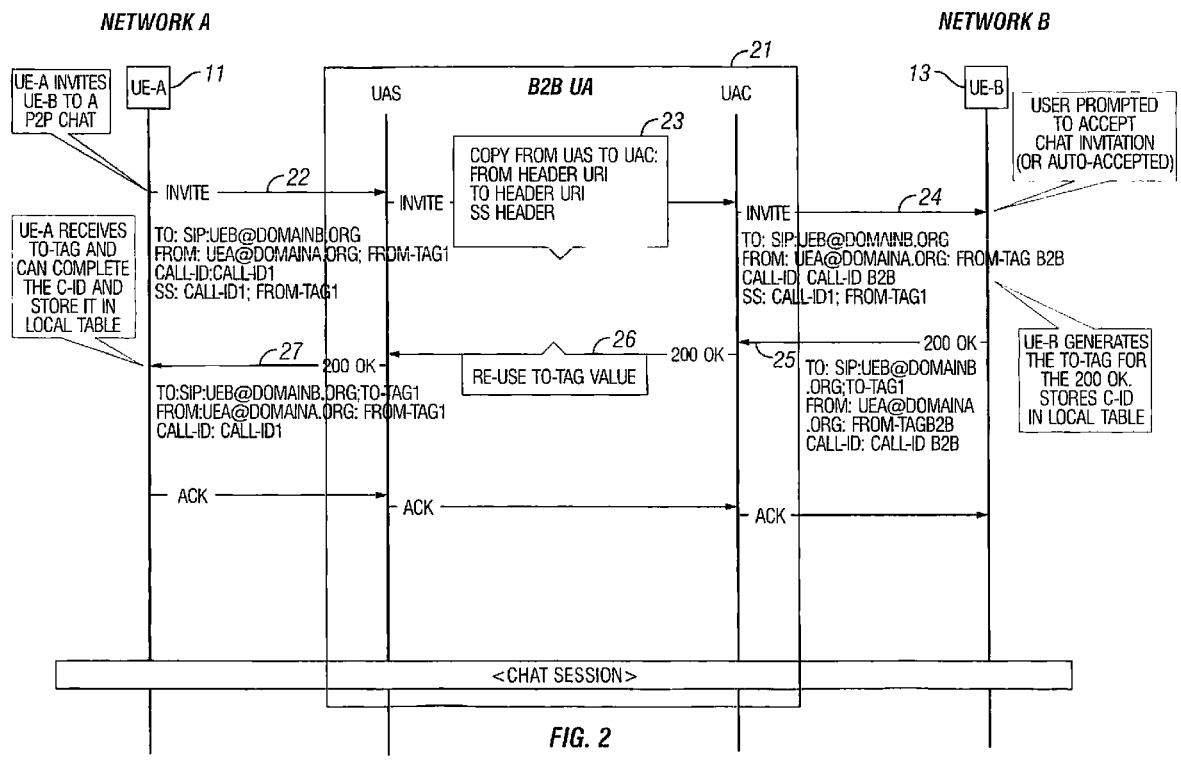
FIG. 2 is a signaling diagram illustrating the flow of messages between various network entities when establishing a P2P session with an intermediary in accordance with the teachings of the present invention.
Figure 3A:
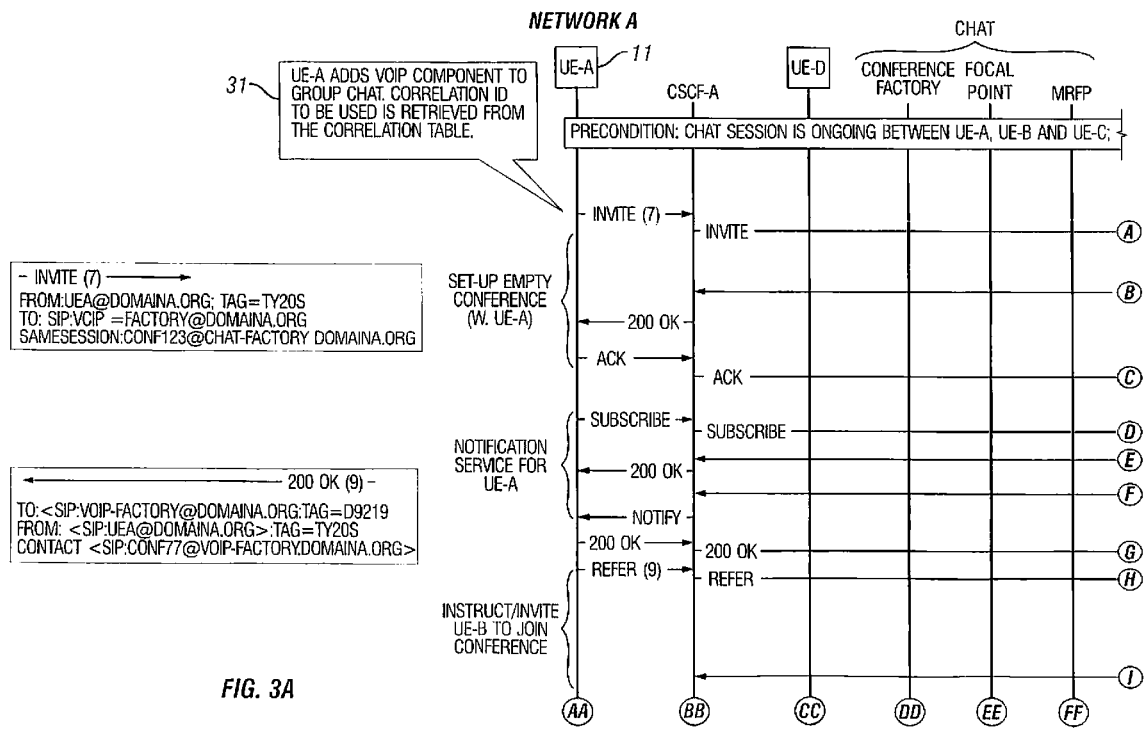
FIGS. 3A-3D are portions of a signaling diagram illustrating the flow of messages between various network entities when performing the correlation process in a group communication case in accordance with the present invention.
Figure 3B:
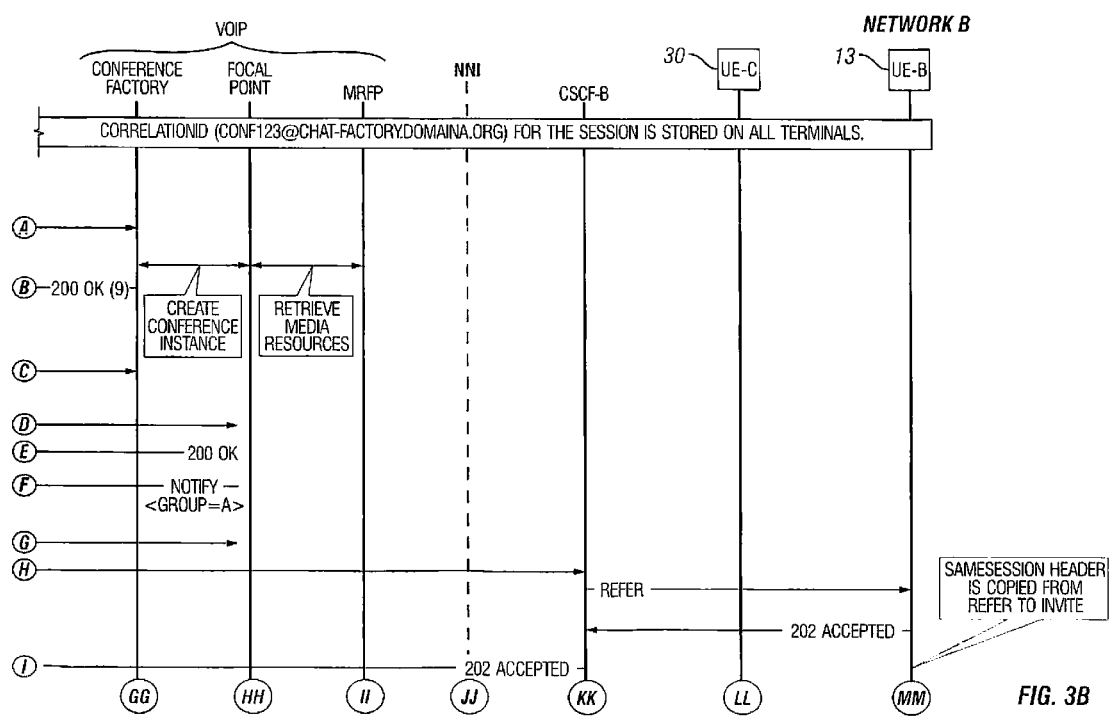
Figure 3C:
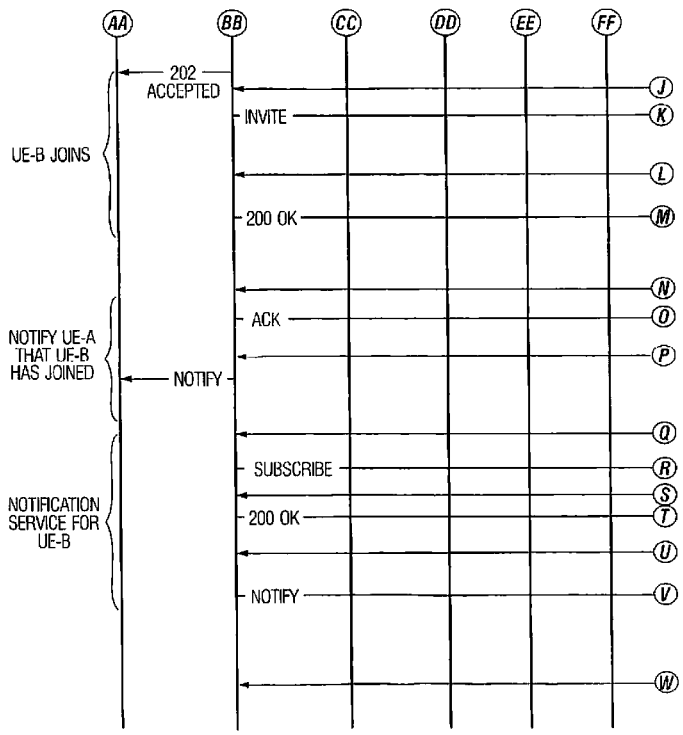
Figure 3D:
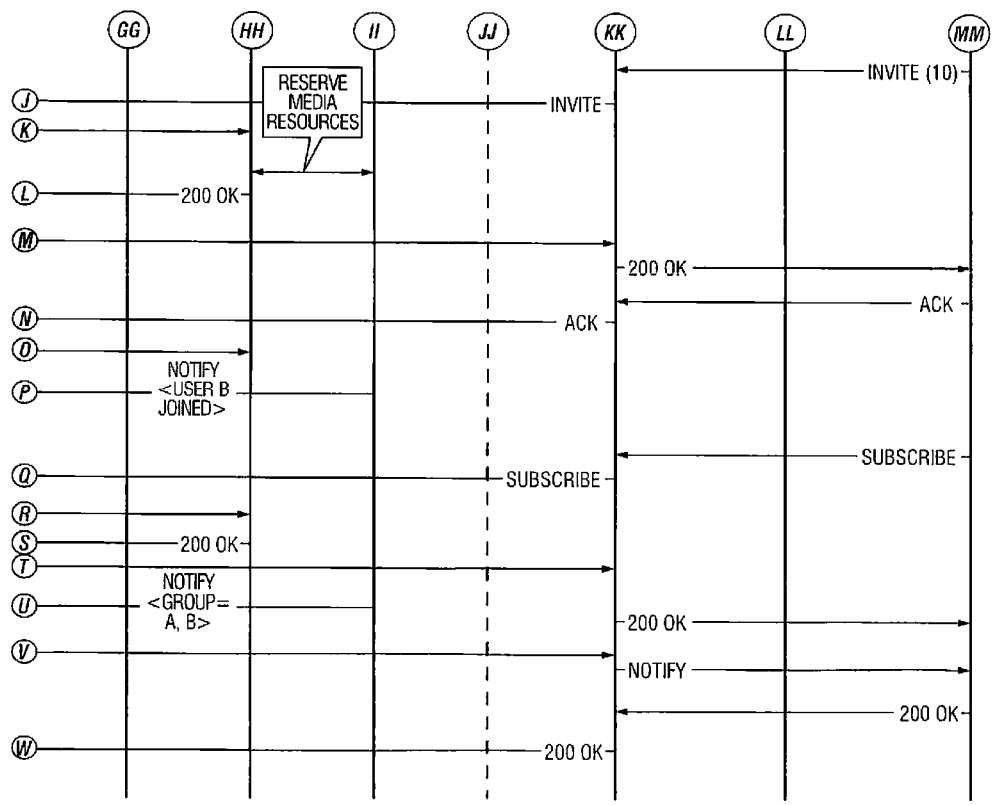

FIG. 2 is a signaling diagram illustrating the flow of messages between various network entities when establishing a P2P session with an intermediary B2B UA 21 in accordance with the present invention. In the event of an intermediary to the P2P flow, the two peers (UE-A 11 and UE-B 13) are not directly connected. Instead, there are two different sessions, one between the intermediary and each respective peer. Therefore, additional logic is required to correlate the sessions. For example, if a B2B UA is placed between the two peers, there are certain functionalities required for the generation of the correlation ID.

The B2B UA Shall:
- 22: Receive on first leg at UAS, an INVITE from UE-A directed to UAC
- 23: Copy from server to client side (INVITE): SS information, From header, and To header
- 24: Send INVITE from UAC to UE-B on second leg
- 25: Receive 200 OK from UE-B
- 26: Re-use To-Tag value in the correlation-ID from client to server side (200 OK)
- 27: Send 200 OK from UAS to UE-A on first leg.

The correlation table in this scenario is created and populated in the same way as shown in Table 1 above.

In the case of group communication via a focal point, the correlation ID can be created using the focal point URI. To be able to communicate a common correlation ID to participants of a conference, the correlation ID is included in the REFER request transmitted either to the participant (dial-in) or to the focal point (dial-out). The correlation ID may be included in full in the REFER request. Further, it is required that the receiving party copy the Same-Session header value in the REFER to the Same-Session header of the subsequent INVITE message.

Table 2 below is a correlation table illustrating a scenario in which two communication parties have established one chat and one VoIP session between them via two focal points. Note that the URI of the first focal point is used to create the correlation ID, which is used also for correlation of the second session. Moreover, in a potential case of both sessions traversing the same focal point, the table would be identical.

TABLE 2

| Correlation ID | Dialogue ID | |
|---|---|---|
| conf123@factory.domainA.org | Call-ID1, From-Tag1, To-Tag1 | Chat session |
| conf123@factory.domainA.org | Call-ID2, From-Tag2, To-tag2 | VoIP session |

Additional intermediaries between the communication partners (e.g., the UAC and the focal point(s)) should be transparent to the communication. This means that the content of the Same-Session header should be copied from one side of a B2B UA to the other.

FIGS. 3A-3D are portions of a signaling diagram illustrating the flow of messages between various network entities when performing the correlation process in a group communication case in accordance with the present invention. A precondition for this process is that a chat session is ongoing between UE-A 11, UE-B 13, and UE-C 30. The correlation ID (conf123@chat-factory.domainA.org) is stored on all terminals.

At step 31, UE-A 11 adds a VoIP component to the group chat and invites UE-B 13 to participate. UE-A retrieves from its correlation table, the correlation ID to be used for the VoIP session. UE-A adds the correlation ID to the Same-Session header of the INVITE message 7. Later, UE-A again includes the correlation ID in the Same-Session header of the REFER message 9 sent to UE-B. UE-B copies the Same-Session header from the REFER message into the INVITE message 10, which is returned, signifying UE-B's acceptance. In this manner, the chat session between UE-A, UE-B, and UE-C is correlated with the VoIP session between UE-A and UE-B.

The present invention also includes a method of creating and identifying correlation subsets for independent IMS sessions. The correlation approach described in FIGS. 1-3 is based on the principle of correlation groups identified through a single correlation ID. This methodology does not foresee the correlation of a new session with a subset of an existing group of correlated sessions.

According to the procedure described in FIGS. 1-3, a new session can join a group of correlated sessions by sharing its correlation ID. As an enhancement to the aforementioned basic solution, correlation subgroups may be formed. This enhancement does not require additional data to be available to the parties involved in the correlation.

The procedure for the establishment of the first session and creation/communication of the correlation ID is identical to the basic correlation approach. Subsequently, during establishment of a second session to be correlated with the first session, a new correlation ID is created in accordance with the procedures previously described. This additional correlation ID may be communicated in different ways using the Same-Session header field. First, a single header may be utilized containing multiple correlation IDs separated by commas. An example of this approach is:
Same-Session: Correlation ID1, Correlation ID2
Same-Session: Call-Id1;From-Tag1;To-Tag1, Call-Id2; From-Tag2;To-Tag2
Same-Session: 3s09cs03;ty20s;d92119, 4d10dr04;hg30k; e872k8

Alternatively, multiple headers may be utilized, each with a single correlation ID. An example of this approach is:
SameSession: Correlation ID1
SameSession: Correlation ID2
SameSession: Call-Id1;FromTag1;ToTag1
SameSession: Call-Id2;FromTag2;ToTag2
SameSession: 3s09cs03;ty20s;d92119
SameSession: 4d10dr04;hg30k;e872k8

When individual correlation IDs are carried in multiple headers, the order may be fixed. For example, the value of the first header may be used to indicate the correlation ID of the higher-level session while the value of the second header may be the correlation ID for the new session.

The use of the Same-Session header in the communication flow is analogous to the approach presented in FIGS. 1-3. Here, however, all but the last correlation IDs are already formulated (at the time of establishment of the new session) and inserted in previous Same-Session header(s). The new correlation ID is created as described above and inserted in the new Same-Session header field.

Table 3 below is an exemplary correlation table for the scenario in which two users (A and B) establish three sessions correlated in two subgroups. The correlation table is maintained by the clients.

TABLE 3

| Correlation ID | Dialogue ID | |
| --- | --- | --- |
| Call-ID1, From-Tag1, To-Tag1 | Call-ID1, From-Tag1, To-Tag1 | Chat |
| Call-ID1, From-Tag1, To-Tag1, Call-ID2, From-Tag2, To-Tag2 | Call-ID2, From-Tag2, To-Tag2 | VoIP |
| Call-ID2, From-Tag2, To-Tag2, Call-ID3, From-Tag3, To-Tag3 | Call-ID3, From-Tag3, To-Tag3 | Video |

Figure 4:
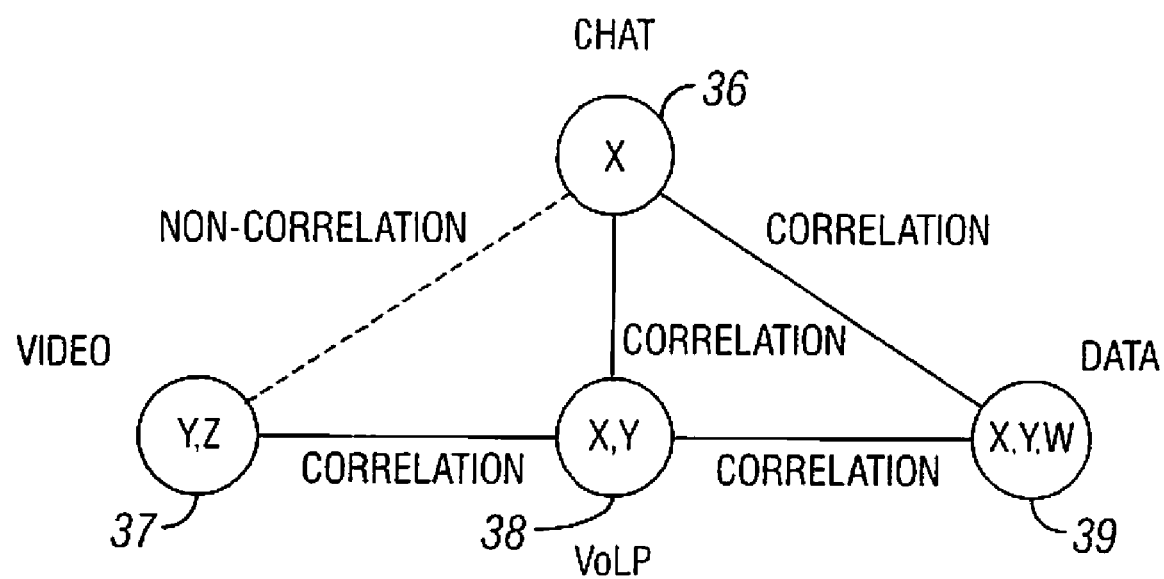
FIG. 4 is an illustrative drawing illustrating a correlation structure between several communication sessions at a high level of abstraction.

FIG. 4 is an illustrative drawing illustrating a correlation structure between four sessions 36-39 at a high level of abstraction. At this level of abstraction, x, y, z, and w represent different correlation IDs. The chat session 36 is correlated with the VoIP session 38 and with the data session 39 using the "x" correlation ID. The Video session 37 is correlated with the VoIP session 38 using the "y" correlation ID. However, the Video session 33 and the chat session 36 are not correlated because they do not share a common correlation ID.

The present invention also includes a method of modifying the correlation ID of an already established session. A further extension to the basic case is to provide the ability to modify the correlation ID of an already established and correlated session. The goal is to modify the correlation table content accordingly. This requires transport of the new correlation ID to the correlation parties along with an instruction to change the previous correlation ID in each party's correlation table. In the context of SIP/IMS, this result may be achieved by sending a re-INVITE for an ongoing session, or by sending another SIP message (for example, MESSAGE, INFO, and the like) within or outside of the ongoing session.

Transporting the information in a SIP MESSAGE method requires the formulation of a request to change the correlation-ID. The request is transported as content by the SIP MESSAGE either within the body of the message or in an additional header (for example, the Same-Session header). The following example illustrates such signaling:

MESSAGE sip:user2@domain.com SIP/2.0
Max-Forwards: 70
From: sip:user1@domain.com;tag=49583
To: sip:user2@domain.com
Call-ID: asd88asd77a@1.2.3.4
CSeq: 1 MESSAGE
Content-Type: text/plain
CorrelationChange: 3s09cs03;ty20s;d92119→4d10dr04; hg30k;e872k8

A response (e.g., 200 OK) indicating the result of the change proposal leads to a change in the correlation table of the sender.

The present invention thus provides a system and method for correlating independent IMS sessions.

It should be noted that the present invention correlates two or more sessions between two or more entities. There may be multiple entities in one correlation "group" and each entity may further be residing in separate correlation groups with separate correlation IDs. For example, two P2P sessions may be established, a first session between entity A and entity B, and a second session between entity A and entity C. Both sessions may utilize the same correlation ID. In this case, the correlation allows entity A to perform intelligent actions with this information. Entity C and entity B are not aware of the other session. Further, entity B and entity C may be part of other correlations with other sessions. For example, entity B may conduct another session with entity C or with entity D utilizing a different correlation ID.

Correlation IDs may also be utilized to form subgroups between different entities. In the basic case, a single correlation ID is shared by all sessions in the correlation group. In an advanced case, a new correlation ID is created for every new session and the correlation IDs are concatenated to signify a correlation group. For example, entity A may start a session with entity B utilizing correlation ID (X). Entity C then connects to entity B and creates a new correlation ID (Y). By concatenating X and Y (X, Y) a correlation ID is formed which signifies a correlation group including both the A-B session and the B-C session. If a fourth party wishes to establish a session, it can choose to correlate with either (X) or (Y) or (X, Y). It may also set up a totally new correlation ID (Z).

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method in a communication system of correlating different end-to-end data sessions, said method comprising:
   creating a globally unique correlation identifier during establishment of a first end-to-end data session between a first party and a second party, the creating step including:
      sending a first portion of the correlation identifier from the first party to the second party, wherein the first portion includes a Session Initiation Protocol (SIP) Call-ID and a SIP From-Tag;
      the second party adding a second, completing portion of the correlation identifier to the first portion, wherein the second portion includes a SIP To-Tag that uniquely identifies the second party; and
      sending the completed correlation identifier from the second party to the first party;
   storing the correlation identifier by the first and second parties;
   utilizing the correlation identifier to correlate with the first end-to-end data session, a second, independent end-to-end data session subsequently established by the first or second party; and
   modifying the correlation identifier by performing the steps of:
      creating a new correlation identifier;
      sending the new correlation identifier to the first and second parties along with an instruction to change the correlation identifier to the new correlation identifier, wherein the new correlation identifier and the instruction are sent in a SIP message selected from a group consisting of a re-INVITE message for the first or the subsequent session, a MESSAGE message, and an INFO message; and
      storing the new correlation identifier by the first and second parties.

2. The method according to claim 1, wherein the step of sending a first portion of the correlation identifier from the first party to the second party includes sending the Call-ID and the From-Tag to the second party in a SIP INVITE message, and the step of sending the completed correlation identifier from the second party to the first party includes sending the Call-ID, From-Tag, and To-Tag to the first party in a SIP 200 OK message sent in response to the SIP INVITE message.

3. The method according to claim 2, wherein the first party sends the Call-ID and the From-Tag in a Same-Session header of the SIP INVITE message.

4. The method according to claim 1, wherein the step of storing the correlation identifier includes storing by each party, the correlation identifier in a mapping unit that maps correlation identifiers to session identifiers, said mapping unit being selected from a group consisting of a correlation table, a hash function, and a mapping function.

5. The method according to claim 4, wherein the step of utilizing the correlation identifier to correlate the first and second data sessions includes:
receiving the correlation identifier in a setup message during establishment of the second, independent data session;
accessing the correlation table utilizing the received correlation identifier; and
associating a session identifier for the second, independent data session with the correlation identifier in the correlation table.

6. The method according to claim 1, wherein the second, independent data session is established between the first and second parties.

7. The method according to claim 1, wherein the second, independent data session is established between the first party and a third party, wherein the first and second data sessions are correlated as a group of independent data sessions.

8. A method in a communication system of correlating different end-to-end data sessions, said method comprising:
creating a globally unique correlation identifier during establishment of a first end-to-end data session between a first party and a second party, the creating step including creating the correlation identifier for a group data session utilizing a unique focal point identifier assigned by a conference factory supporting the group data session;
storing the correlation identifier by the first and second parties; and
utilizing the correlation identifier to correlate with the first end-to-end data session, a second, independent end-to-end data session subsequently established by the first or second party; and
modifying the correlation identifier by performing the steps of:
creating a new correlation identifier;
sending the new correlation identifier to the first and second parties along with an instruction to change the correlation identifier to the new correlation identifier, wherein the new correlation identifier and the instruction are sent in a SIP message selected from a group consisting of a re-INVITE message for the first or the subsequent session, a MESSAGE message, and an INFO message; and
storing the new correlation identifier by the first and second parties.

9. The method according to claim 8, wherein the focal point identifier is communicated to the first party during the conference creation process.

10. The method according to claim 9, wherein the correlation identifier is communicated to all participants of a conference by including the correlation identifier in a REFER request transmitted from the first party to each participant in a dial-in conference, and to the focal point in a dial-out conference.

11. The method according to claim 10, wherein each participant copies the correlation identifier and includes the correlation identifier in a subsequent INVITE message sent in response to the REFER request.

12. A system for correlating different end-to-end data sessions, said system comprising:
means for creating a globally unique correlation identifier during establishment of a first end-to-end data session between a first party and a second party, the creating means including:
logic for sending a first portion of the correlation identifier from the first party to the second party, wherein the first portion includes a Session Initiation Protocol (SIP) Call-ID and a SIP From-Tag;
logic in the second party for adding a second, completing portion of the correlation identifier to the first portion, wherein the second portion includes a SIP To-Tag that uniquely identifies the second party; and
logic for sending the completed correlation identifier from the second party to the first party;
means for storing the correlation identifier by the first and second parties;
means for utilizing the correlation identifier to correlate with the first end-to-end data session, a second, independent end-to-end data session subsequently established by the first or second party; and
means for modifying the correlation identifier, said modifying means including:
logic for creating a new correlation identifier; and
logic for sending the new correlation identifier to the first and second parties along with an instruction to change the correlation identifier to the new correlation identifier, wherein the new correlation identifier and the instruction are sent in a SIP message selected from a group consisting of a re-INVITE message for the first or the subsequent session, a MESSAGE message, and an INFO message;
wherein the storing means replaces the stored correlation identifier with the new correlation identifier.

13. The system according to claim 12, wherein the logic for sending a first portion of the correlation identifier from the first party to the second party sends the Call-ID and the From-Tag to the second party in a SIP INVITE message, and the logic for sending the completed correlation identifier from the second party to the first party sends the Call-ID, From-Tag, and To-Tag to the first party in a SIP 200 OK message sent in response to the SIP INVITE message.

14. The system according to claim 12, wherein the means for storing the correlation identifier includes a mapping unit associated with each party that maps correlation identifiers to session identifiers, said mapping unit being selected from a group consisting of a correlation table, a hash function, and a mapping function.

15. The system according to claim 12, wherein the means for utilizing the correlation identifier to correlate the first data session with the second, independent data session includes logic for correlating with the first data session, a second, independent data session established between the first and second parties.

16. The system according to claim 12, wherein the means for utilizing the correlation identifier to correlate the first data session with the second, independent data session includes logic for correlating with the first session, a second, independent data session established between the first party and a third party, wherein the first and second data sessions are correlated as a group of independent data sessions.

17. A system for correlating different end-to-end data sessions, said system comprising:
- means for creating a globally unique correlation identifier during establishment of a first end-to-end data session between a first party and a second party, the creating means including logic for creating the correlation identifier for a group data session utilizing a unique focal point identifier assigned by a conference factory supporting the group data session;
- means for storing the correlation identifier by the first and second parties;
- means for utilizing the correlation identifier to correlate with the first end-to-end data session, a second, independent end-to-end data session subsequently established by the first or second party; and
- means for modifying the correlation identifier, said modifying means including:
  - logic for creating a new correlation identifier; and
  - logic for sending the new correlation identifier to the first and second parties along with an instruction to change the correlation identifier to the new correlation identifier, wherein the new correlation identifier and the instruction are sent in a SIP message selected from a group consisting of a re-INVITE message for the first or the subsequent session, a MESSAGE message, and an INFO message;
- wherein the storing means replaces the stored correlation identifier with the new correlation identifier.

* * * * *